(12) United States Patent
Hanada

(10) Patent No.: US 10,822,016 B2
(45) Date of Patent: Nov. 3, 2020

(54) SHOCK-ABSORBING STOPPER

(71) Applicant: NOK CORPORATION, Tokyo (JP)

(72) Inventor: Yuki Hanada, Tottori (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/083,312

(22) PCT Filed: Mar. 7, 2017

(86) PCT No.: PCT/JP2017/008865
§ 371 (c)(1),
(2) Date: Sep. 7, 2018

(87) PCT Pub. No.: WO2017/154856
PCT Pub. Date: Sep. 14, 2017

(65) Prior Publication Data
US 2019/0031227 A1 Jan. 31, 2019

(30) Foreign Application Priority Data
Mar. 10, 2016 (JP) .................. 2016-046701

(51) Int. Cl.
*B62D 1/19* (2006.01)
*F16F 7/00* (2006.01)
(Continued)

(52) U.S. Cl.
CPC ................ *B62D 1/195* (2013.01); *B62D 3/12* (2013.01); *F16F 1/3732* (2013.01); *F16F 7/00* (2013.01);
(Continued)

(58) Field of Classification Search
CPC ................ F16F 13/101; F16F 13/1409; F16F 2230/007; F16F 1/3828; F16F 1/3723;
(Continued)

(56) References Cited

U.S. PATENT DOCUMENTS 4,998,997 A * 3/1991 Carlston .................. B61F 5/142
105/198.7
9,573,615 B2 * 2/2017 Schaumann ............. B62D 3/12
(Continued)

FOREIGN PATENT DOCUMENTS

CN 102667218 9/2012
CN 105121892 12/2015
(Continued)

OTHER PUBLICATIONS

Official Communication issued in European Patent Office (EPO) Patent Application No. 17763196.7, dated Feb. 28, 2019.
(Continued)

*Primary Examiner* — Vishal R Sahni
(74) *Attorney, Agent, or Firm* — Greenblum & Bernstein, P.L.C.

(57) ABSTRACT

Shock-absorbing stopper for preventing an elastic body from contacting a mating component, to cause sliding wear in a structure having a hollow in an outer peripheral surface. The stopper has a cylindrical elastic body, to which a fixed-side metal fitting is connected and to which a movable-side metal fitting is connected and an annular hollow in the outer peripheral surface, in which the stopper is sectioned into three portions by the hollow of a small diameter portion formed by the hollow, a fixed-side large diameter portion located closer to the fixed side, and a movable-side large diameter portion located closer to the movable side. The outer diameter dimension of the movable-side large diameter portion is smaller than the outer diameter dimension of the fixed-side large diameter portion and the axial width of the movable-side large diameter portion is smaller than the axial width of the fixed-side large diameter portion.

12 Claims, 4 Drawing Sheets

(51) Int. Cl.
  *B62D 3/12* (2006.01)
  *F16F 1/373* (2006.01)
(52) U.S. Cl.
  CPC ....... *F16F 2234/02* (2013.01); *F16F 2236/04* (2013.01)
(58) Field of Classification Search
  CPC .... F16F 15/08; F16F 7/00; B60G 2204/4502; B62D 3/12
  See application file for complete search history.

(56) References Cited

U.S. PATENT DOCUMENTS

| | | | |
|---|---|---|---|
| 2006/0027431 A1* | 2/2006 | Fukushima | F16F 9/585 188/284 |
| 2009/0039574 A1* | 2/2009 | Cook | F16F 1/3713 267/3 |
| 2099/0039574 | 2/2009 | Cook | |
| 2011/0156327 A1* | 6/2011 | Nobusue | B60G 7/04 267/153 |
| 2012/0111132 A1* | 5/2012 | Schaumann | B62D 3/12 74/29 |
| 2016/0089952 A1* | 3/2016 | Kato | F16F 9/38 267/292 |

FOREIGN PATENT DOCUMENTS

| | | | |
|---|---|---|---|
| EP | 1500573 | * | 1/2005 |
| JP | 2001-280388 | | 10/2001 |
| JP | 2001280388 | * | 10/2001 |
| JP | 4620291 | | 11/2010 |
| JP | 2015-108414 | | 6/2015 |
| JP | 2015-112960 | | 6/2015 |
| JP | 2015186950 | * | 10/2015 |
| WO | 03/097427 | | 11/2003 |
| WO | WO2014092630 | * | 6/2014 |
| WO | 2014/188889 | | 11/2014 |

OTHER PUBLICATIONS

Official Communication issued in International Bureau of WIPO Patent Application No. PCT/JP2017/008865, dated May 9, 2017.
Office Action issued in China Counterpart Patent Appl. No. 20170006991.6, dated Jun. 4, 2019.

* cited by examiner

SHOCK-ABSORBING STOPPER

BACKGROUND OF THE INVENTION

Field of the Invention

The present invention relates to a shock-absorbing stopper having both a shock absorbing function and a stopper function. The shock-absorbing stopper of the present invention is installed in a steering device and the like in the field of automobile equipment, for example, or used in the field of industrial equipment and the like.

Description of the Conventional Art

Heretofore, a shock-absorbing stopper 51 illustrated in FIG. 3A is known. The shock-absorbing stopper 51 has a cylindrical elastic body 52, in which a fixed-side metal fitting 53 is connected to one end portion (upper end portion in the figure) of the elastic body 52 and a movable-side metal fitting 54 is connected to the other end portion (lower end portion in the figure) thereof. The one end portion (hereinafter sometimes also referred to as a fixed-side end portion 55) to which the fixed-side metal fitting 53 is connected is fixed to a housing 61 which is a mating component. A shaft (not illustrated) which is an actuating component collides with the other end portion (hereinafter sometimes also referred to as a movable-side end portion 56) to which the movable-side metal fitting 54 is connected, so that the other end portion is displaced together with the shaft.

PRIOR ART DOCUMENT

Patent Documents

Patent Document 1: Japanese Patent No. 4620291

When the shaft collides with the movable-side end portion 56, so that a load P is applied as illustrated in FIG. 3B, the movable-side end portion 56 is displaced in a direction approaching the fixed-side end portion 55, so that the elastic body 52 is compressed. Therefore, the shock absorbing function by the compression and deformation of the elastic body 52 is exhibited. An outer peripheral surface 52a of the compressed elastic body 52 is radially outward swollen and deformed to contact an inner peripheral surface 61a of the housing 61. The movable-side end portion 56 is continuously displaced also after the elastic body 52 contacts the housing 61, and therefore the elastic body 52 slides in a contact portion with the housing 61. Therefore, wear due to the sliding occurs, so that the performance of the stopper 51 decreases.

In order to suppress the sliding wear of the elastic body 52, it is considered to provide an annular hollow 57 in the outer peripheral surface of the elastic body 52 as illustrated in a reference example of FIG. 4 to thereby reduce the swollen and deformed amount when compressed to reduce the contact surface pressure to the housing 61.

SUMMARY OF THE INVENTION

Problem to be Solved by the Invention

However, when the hollow 57 is provided in the outer peripheral surface of the elastic body 52 as described above, the following points need to be taken into consideration.

More specifically, when the hollow 57 is provided in the outer peripheral surface of the elastic body 52 as described above, the stopper 51 is sectioned into three portions of a small diameter portion 51A formed by the hollow 57, a fixed-side large diameter portion 51B located closer to the fixed side relative to the hollow 57, and a movable-side large diameter portion 51C located closer to the movable side relative to the hollow 57.

In this case, when an outer diameter dimension $\phi d_1$ of the fixed-side large diameter portion 51B and an outer diameter dimension $\phi d_2$ of the movable-side large diameter portion 51C are equally set ($\phi d_1 = \phi d_2$) and an axial width $w_1$ of the fixed-side large diameter portion 51B and an axial width $w_2$ of the movable-side large diameter portion 51C are equally set ($w_1 = w_2$) so as to equalize the dimensions, there is a possibility that the following inconvenience may occur.

More specifically, according to the above-described setting $\phi d_1 = \phi d_2$ and $w_1 = w_2$), an axial width $w_4$ of the elastic body 52 obtained by subtracting an axial width (thickness) $w_3$ of the movable-side metal fitting 54 from the axial width $w_2$ of the movable-side large diameter portion 51C is set considerably large.

Therefore, when the shaft collides with the movable-side end portion 56, so that the load P is applied, whereby the movable-side end portion 56 is displaced in a direction approaching the fixed-side end portion 55, so that the elastic body 52 is compressed, the outer peripheral surface of the elastic body 52 is radially outward swollen and deformed in the movable-side large diameter portion 51C to contact the inner peripheral surface 61a of the housing 61. Then, the movable-side end portion 56 is continuously displaced also after the elastic body 52 contacts the housing 61 as described above, and therefore the elastic body 52 slides in the movable-side large diameter portion 51C, so that the wear due to the sliding occurs. This phenomenon is likely to occur particularly when the axial displacement amount of the movable-side end portion 56 to the fixed-side end portion 55 is excessively large (larger than expected).

In view of the above-described points, it is an object of the present invention to provide a shock-absorbing stopper capable of preventing an elastic body from contacting a mating component, such as a housing, to cause sliding wear as much as possible in a structure where a hollow is provided in the outer peripheral surface of the elastic body.

Means for Solving the Problem

In order to achieve the above-described object, a shock-absorbing stopper of the present invention has a cylindrical elastic body, to one end portion of which a fixed-side metal fitting is connected and to the other end portion of which a movable-side metal fitting is connected and which has an annular hollow in the outer peripheral surface of the cylindrical elastic body, in which the shock-absorbing stopper is sectioned into three portions by the hollow of a small diameter portion formed by the hollow, a fixed-side large diameter portion located closer to the fixed side relative to the hollow, and a movable-side large diameter portion located closer to the movable side relative to the hollow, the outer diameter dimension of the movable-side large diameter portion is set smaller than the outer diameter dimension of the fixed-side large diameter portion, and the axial width of the movable-side large diameter portion is set smaller than the axial width of the fixed-side large diameter portion.

In the structure where the hollow is provided in the outer peripheral surface of the elastic body, a portion where the sliding wear is likely to occur is the outer peripheral surface of the movable-side large diameter portion located closer to the movable side relative to the hollow among the sectioned three portions. Then, the present invention is configured so that the outer diameter dimension of the movable-side large diameter portion is set smaller than the outer diameter dimension of the fixed-side large diameter portion, and thus a relatively large radial gap is set between the movable-side large diameter portion and the mating component, such as a housing. Moreover, the axial width of the movable-side large diameter portion is set smaller than the axial width of the movable-side large diameter portion, and thus, even when the movable-side large diameter portion is swollen and deformed, the swollen and deformed amount is suppressed. Accordingly, the radial gap is set large by the former and the swollen and deformed amount is suppressed by the latter, and therefore the movable-side large diameter portion does not contact the housing even when the movable-side large diameter portion is swollen and deformed or, even when the movable-side large diameter portion contacts the housing, the contact surface pressure or the contact width can be reduced. Therefore, the sliding wear is hard to occur in the movable-side large diameter portion.

Effect of the Invention

The present invention can prevent an elastic body from contacting a mating component, such as a housing, to cause sliding wear as much as possible in a structure where a hollow is provided in the outer peripheral surface of the elastic body.

BRIEF EXPLANATION OF THE DRAWINGS

FIG. 3 is a cross-sectional view views of a principal portion of a shock-absorbing stopper according to a conventional example.

DETAILED DESCRIPTION OF PREFERRED EMBODIMENTS

Next, embodiments of the present invention are described with reference to the drawings.

First Embodiment

Figure 1:
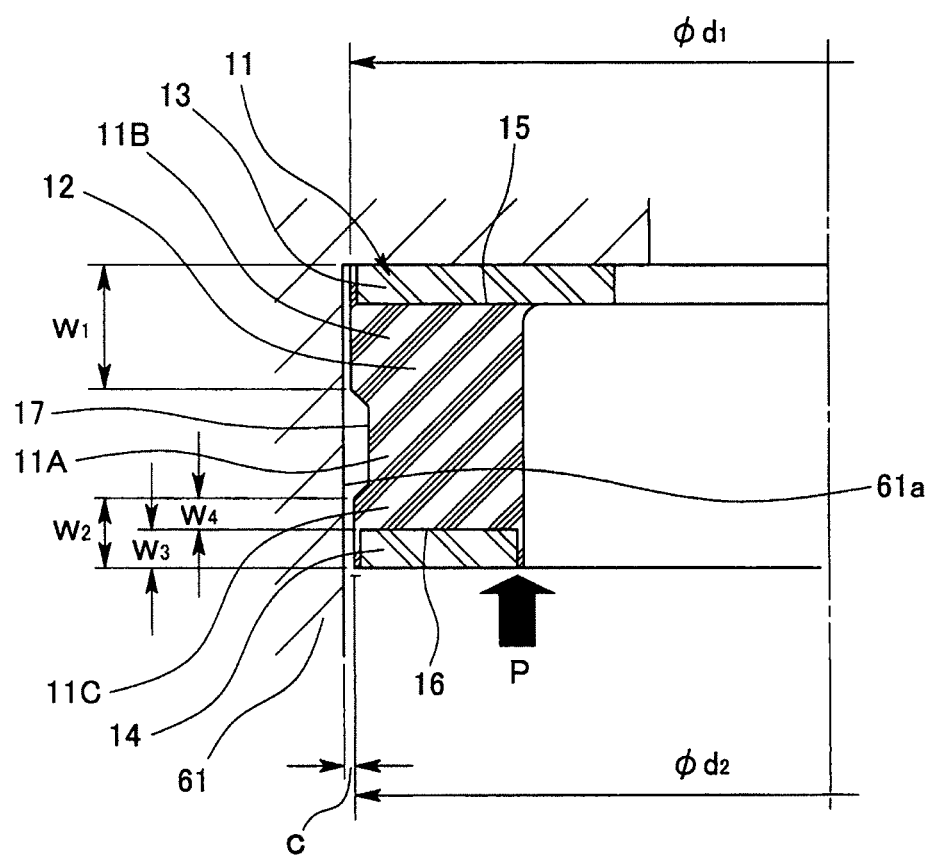
FIG. 1 is a cross-sectional view of a principal portion of a shock-absorbing stopper according to a first embodiment of the present invention.

As illustrated in FIG. 1, a shock-absorbing stopper 11 according to this embodiment has a cylindrical elastic body 12 containing a predetermined rubber-like elastic body, in which an annular fixed-side metal fitting 13 is connected to one axial end portion (upper end portion in the figure) of the cylindrical elastic body 12 and an annular movable-side metal fitting 14 is connected to the other axial end portion (lower end portion in the figure) thereof. The one end portion (hereinafter sometimes also referred to as a fixed-side end portion 15) to which the fixed-side metal fitting 13 is connected is fixed to the housing 61 which is a mating component. A shaft (not illustrated) which is an actuating component collides with the other end portion (hereinafter sometimes also referred to as a movable-side end portion 16) to which the movable-side metal fitting 14 is connected, so that the other end portion is displaced together with the shaft.

An annular hollow 17 is provided in the outer peripheral surface of the elastic body 12. Moreover, due to the fact that the annular hollow 17 is provided in the outer peripheral surface of the elastic body 12 as described above, the shock-absorbing stopper 11 is sectioned into three portions, that is, a small diameter portion 11A formed by the hollow 17, and having an outer peripheral surface of a relatively small diameter, a fixed-side large diameter portion 11B located closer to the fixed side relative to the hollow 17 and having an outer peripheral surface of a relatively large diameter, and a movable-side large diameter portion 11C located closer to the movable side relative to the hollow 17 and having an outer peripheral surface of a relatively large diameter.

Furthermore, in this embodiment, the outer diameter dimension $\phi d_2$ of the movable-side large diameter portion 11C is set smaller than the outer diameter dimension $\phi d_1$ of the fixed-side large diameter portion 11B ($\phi d_1 > \phi d_2$) and the axial width $w_2$ of the movable-side large diameter portion 11C is set smaller than the axial width $w_1$ of the fixed-side large diameter portion 11B ($w_1 > w_2$) among the sectioned three portions.

In the shock-absorbing stopper 11 of the above-described configuration, when the shaft collides with the movable-side end portion 16, so that the load P is applied, whereby the movable-side end portion 16 is displaced in a direction approaching the fixed-side end portion 15, so that the elastic body 12 is compressed, the outer peripheral surface of the elastic body 12 tends to be radially outward swollen and deformed in the movable-side large diameter portion 11C to contact the inner peripheral surface 61a of the housing 61. However, the outer diameter dimension $\phi d_2$ of the movable-side large diameter portion 11C is set smaller than the outer diameter dimension $\phi d_1$ of the fixed-side large diameter portion 11B ($\phi d_1 > \phi d_2$) as described above, and therefore a relatively large radial gap c is set between the movable-side large diameter portion 11C and the inner peripheral surface 61a of the housing 61.

Moreover, the axial width $w_2$ of the movable-side large diameter portion 11C is set smaller than the axial width $w_1$ of the fixed-side large diameter portion 11B ($w_1 > w_2$) as described above, and therefore, even when the movable-side large diameter portion 11C is swollen and deformed, the swollen and deformed amount can be suppressed.

Accordingly, the radial gap c is set large due to $\phi d_1 > \phi d_2$ of the former and the swollen and deformed amount is suppressed due to $w_1 > w_2$ of the latter, and therefore the movable-side large diameter portion 11C does not contact the housing 61 even when the movable-side large diameter portion 11C is swollen and deformed or, even when the movable-side large diameter portion 11C contacts the housing 61, the contact surface pressure and the contact width can be reduced. Therefore, the sliding wear is hard to occur in the movable-side large diameter portion 11C.

Second Embodiment

The first embodiment described above is configured so that the axial width $w_2$ of the movable-side large diameter portion 11C is the sum of the axial width (thickness) $w_3$ of the movable-side metal fitting 14 and the axial width $w_4$ between the hollow 17 in the elastic body 12 and the movable-side metal fitting 14, and as the axial width $w_2$ of the movable-side large diameter portion 11C becomes small, the axial width $w_4$ between the hollow 17 in the elastic body 12 and the movable-side metal fitting 14 also becomes small in connection therewith. However, the axial width $w_2$ of the movable-side large diameter portion 11C may be set only by the axial width (thickness) $w_3$ of the movable-side metal fitting 14. In this case, the axial width $w_4$ between the hollow 17 in the elastic body 12 and the movable-side metal fitting 14 is set to zero.

Figure 2:
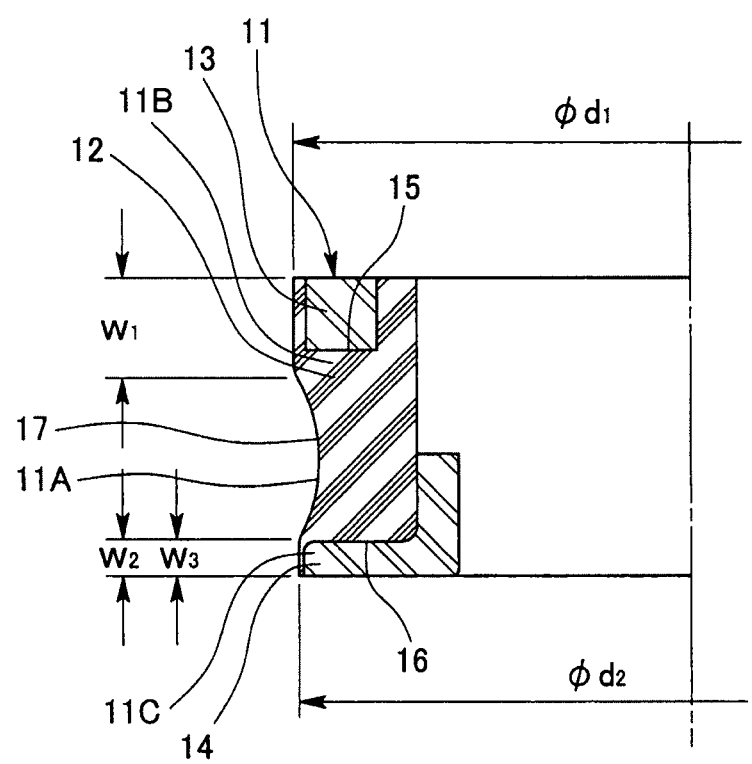
FIG. 2 is a cross-sectional view of a principal portion of a shock-absorbing stopper according to a second embodiment of the present invention.
Figure 3A:
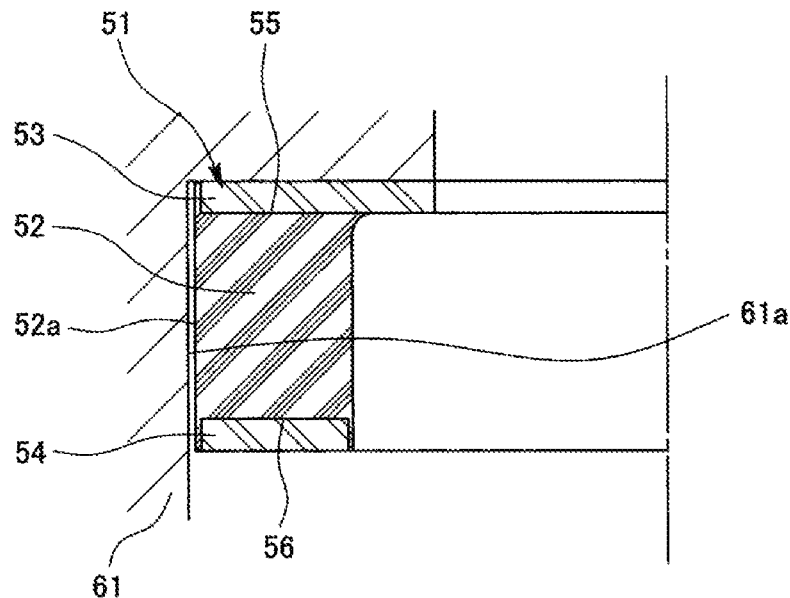
FIGS. 3A and 3B are
Figure 3B:
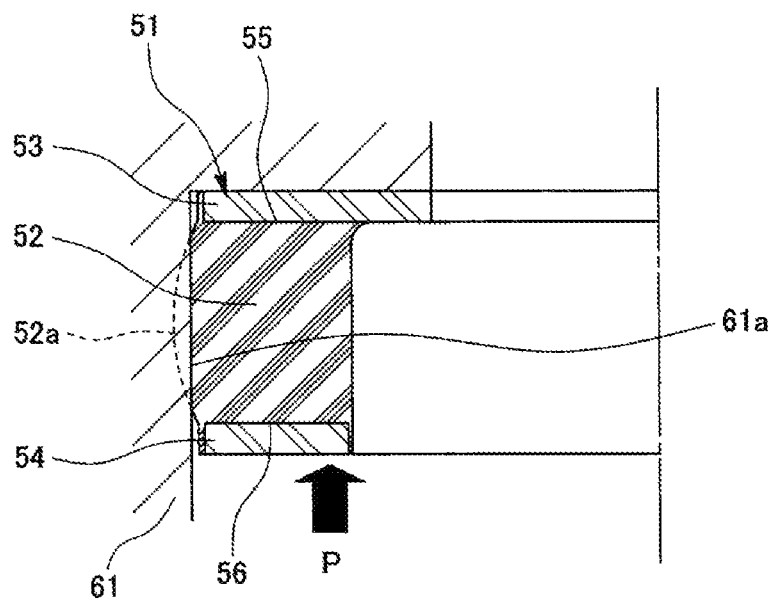
Figure 4:
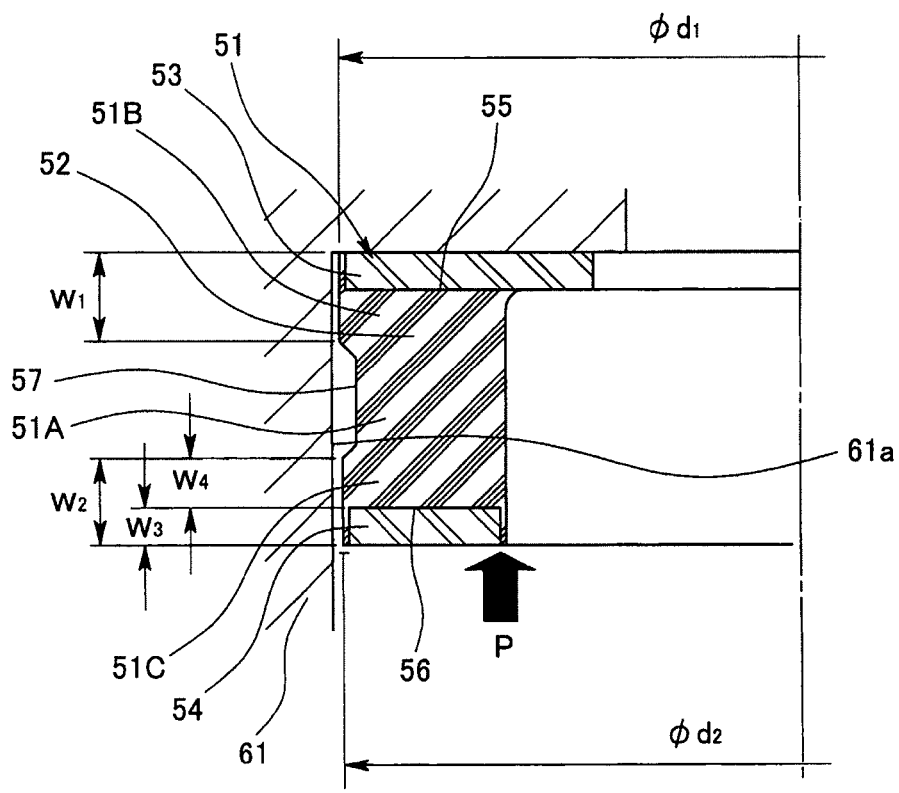
FIG. 4 is a cross-sectional view of a principal portion of a shock-absorbing stopper according to a reference example.

In a shock-absorbing stopper 11 illustrated in FIG. 2 as a second embodiment, the axial width $w_2$ of the movable-side large diameter portion 11C is set only by the axial width (thickness) $w_3$ of the movable-side metal fitting 14 and the axial width between the hollow 17 in the elastic body 12 and the movable-side metal fitting 14 is set to zero from such a viewpoint.

According to this configuration, the position of the hollow 17 further shifts to the movable-side as compared with the first embodiment, and therefore the elastic body 12 does not contact the housing 61 even when the elastic body 12 is swollen and deformed or, even when the elastic body 12 contacts the housing 61, the contact surface pressure and the contact width can be further reduced. Therefore, the sliding wear is harder to occur in the elastic body 12.

The shape of the fixed-side metal fitting 13 or the movable-side metal fitting 14 is not particularly limited and may be a ring having a rectangular cross section or a ring having an L-shaped cross section as illustrated in FIG. 2 or the like besides the plate-like ring as illustrated in FIG. 1.

DESCRIPTION OF REFERENCE NUMERALS 11 shock absorbing stopper
11A small diameter portion
11B fixed-side large diameter portion
11C movable-side large diameter portion
12 elastic body
13 fixed-side metal fitting
14 movable-side metal fitting
15 fixed-side end portion
16 movable-side end portion
17 hollow
61 housing (mating component)
61a inner peripheral surface

What is claimed is:
1. A shock-absorbing stopper comprising:
a cylindrical elastic body, to one end portion of which a fixed-side metal fitting is connected and to another end portion of which a movable-side metal fitting is connected and which has an annular hollow in an outer peripheral surface of the cylindrical elastic body, wherein
the cylindrical elastic body is sectioned into three portions by the hollow of a small diameter portion formed by the hollow, a fixed-side large diameter portion located closer to a fixed side relative to the hollow, and a movable-side large diameter portion located closer to a movable side relative to the hollow,
an outer diameter dimension of the movable-side large diameter portion is set smaller than an outer diameter dimension of the fixed-side large diameter portion,
an axial width of the movable-side large diameter portion is set smaller than an axial width of the fixed-side large diameter portion,
a portion of the fixed-side large diameter portion overlaps with the fixed-side metal fitting in a radial direction of the shock-absorbing stopper and is disposed radially outward from a radially outer surface of the fixed-side metal fitting,
the fixed-side metal fitting includes a through hole,
the movable-side metal fitting includes a through hole, and
a surface of the cylindrical elastic body is disposed inside the through hole of only one of the fixed-side metal fitting and the movable-side metal fitting and is abutted against a radially inner surface of the one of the fixed-side metal fitting and the movable-side metal fitting in the radial direction of the shock-absorbing stopper.

2. The shock-absorbing stopper according to claim 1, wherein
the fixed-side metal fitting is plate-shaped and includes an annular ring shape with the through hole.

3. The shock-absorbing stopper according to claim 1, wherein
the movable-side metal fitting is plate-shaped and includes an annular ring shape with the through hole.

4. The shock-absorbing stopper according to claim 1, wherein
the fixed-side metal fitting is plate-shaped and includes an annular ring shape with the through hole,
the movable-side metal fitting is plate-shaped and includes an annular ring shape with the through hole, and
an inner end of the fixed-side metal fitting projects radially inwardly relative to an inner end of the movable-side metal fitting so that the inner end of the fixed-side metal fitting does not overlap with the movable-side metal fitting in an axial direction of the shock-absorbing stopper.

5. The shock-absorbing stopper according to claim 1, wherein
the movable-side metal fitting is L-shaped in cross section and includes an annular ring shape with the through hole.

6. The shock-absorbing stopper according to claim 1, wherein
the fixed-side metal fitting is rectangular-shaped in cross section and includes an annular ring shape with the through hole,
the movable-side metal fitting is L-shaped in cross section and includes an annular ring shape with the through hole, and
an inner end of the movable-side metal fitting projects radially inwardly relative to an inner end of the fixed-side metal fitting so that the inner end of the movable-side metal fitting does not overlap with the fixed-side metal fitting in an axial direction of the shock-absorbing stopper.

7. The shock-absorbing stopper according to claim 1, wherein
a portion of the cylindrical elastic body does not overlap with the fixed-side metal fitting and the movable-side metal fitting in an axial direction of the shock-absorbing stopper.

8. The shock-absorbing stopper according to claim 1, wherein
a portion of the movable-side large diameter portion overlaps with the movable-side metal fitting in the radial direction of the shock-absorbing stopper and is disposed radially outward from a radially outer surface of the movable-side metal fitting.

9. A shock-absorbing stopper assembly, comprising:
a shock-absorbing stopper including:
- a cylindrical elastic body, to one end portion of which a fixed-side metal fitting is connected and to another end portion of which a movable-side metal fitting is connected and which has an annular hollow in an outer peripheral surface of the cylindrical elastic body; and a housing that includes an inner peripheral surface surrounding the shock-absorbing stopper in a circumferential direction, wherein the cylindrical elastic body is sectioned into three portions by the hollow of a small diameter portion formed by the hollow, a fixed-side large diameter portion located closer to a fixed side relative to the hollow, and a movable-side large diameter portion located closer to a movable side relative to the hollow, an outer diameter dimension of the movable-side large diameter portion is set smaller than an outer diameter dimension of the fixed-side large diameter portion, an axial width of the movable-side large diameter portion is set smaller than an axial width of the fixed-side large diameter portion, a portion of the fixed-side large diameter portion overlaps with the fixed-side metal fitting in a radial direction of the shock-absorbing stopper and is disposed radially outward from a radially outer surface of the fixed-side metal fitting, the fixed-side metal fitting includes a through hole,
the movable-side metal fitting includes a through hole, and a surface of the cylindrical elastic body is disposed inside the through hole of only one of the fixed-side metal fitting and the movable-side metal fitting and is abutted against a radially inner surface of the one of the fixed-side metal fitting and the movable-side metal fitting in the radial direction of the shock-absorbing stopper.

10. The shock-absorbing stopper assembly according to claim 9, wherein when the shock-absorbing stopper is compressed, the cylindrical elastic body does not exert a pressing force against the inner peripheral surface of the housing.

11. The shock-absorbing stopper assembly according to claim 9, wherein a radial gap is maintained between the shock-absorbing stopper and the inner peripheral surface of the housing across an entire axial length of the shock-absorbing stopper.

12. The shock-absorbing stopper assembly according to claim 9, wherein a portion of the movable-side large diameter portion overlaps with the movable-side metal fitting in the radial direction of the shock-absorbing stopper and is disposed radially outward from a radially outer surface of the movable-side metal fitting.

* * * * *